United States Patent
Kopmeiners et al.

(10) Patent No.: US 8,542,755 B2
(45) Date of Patent: Sep. 24, 2013

(54) TIME ACCURATE CONTROL OF RF OVER A DIGRF INTERFACE

(75) Inventors: Rob Kopmeiners, Nijmegen (NL); Jeroen Cornelis Kuenen, Beuningen (NL)

(73) Assignee: St-Ericsson SA, Plan-Les-Ouates (CH)

( * ) Notice: Subject to any disclaimer, the term of this patent is extended or adjusted under 35 U.S.C. 154(b) by 988 days.

(21) Appl. No.: 12/540,194

(22) Filed: Aug. 12, 2009

(65) Prior Publication Data

US 2010/0074311 A1 Mar. 25, 2010

(30) Foreign Application Priority Data

Aug. 12, 2008 (EP) .................................... 08162214

(51) Int. Cl.
*H04L 27/00* (2006.01)
*H04L 7/00* (2006.01)
*H04B 1/18* (2006.01)

(52) U.S. Cl.
USPC .......................... 375/259; 375/354; 455/181.1

(58) Field of Classification Search
USPC ......... 375/259, 354, 371, 373, 374; 370/503, 370/516, 517; 455/181.1
See application file for complete search history.

(56) References Cited

U.S. PATENT DOCUMENTS

| | | | | |
|---|---|---|---|---|
| 7,386,059 B2 * | 6/2008 | Pilgram et al. | ................ | 375/295 |
| 7,948,964 B1 * | 5/2011 | Khlat et al. | ................... | 370/350 |
| 2002/0142741 A1 * | 10/2002 | Molnar et al. | ................ | 455/127 |
| 2003/0224745 A1 * | 12/2003 | Gealow et al. | ............. | 455/181.1 |

* cited by examiner

*Primary Examiner* — Sam K Ahn
*Assistant Examiner* — Vineeta Panwalkar
(74) *Attorney, Agent, or Firm* — Coats & Bennett, P.L.L.C.

(57) ABSTRACT

A communication system includes a RF subsystem that communicates with a BB subsystem through a digital RF-BB interface multiplexing I/Q data and control signals in both TX and RX directions. The RF subsystem includes a FIFO buffer in each respective TX and RX chain and a timer that assigns a timestamp to the continuous stream in both TX and RX chains whenever it is equal to a time event from the BB subsystem. The BB subsystem includes a sample counter that counts the number (k) of data samples at the FIFO buffer and a controller that defines the time event. Precise alignment at the air interface between a data burst from the RF subsystem and a data burst from the BB subsystem can be achieved using the timer, based on the relation between the timer value (n) and the sample count (k).

20 Claims, 7 Drawing Sheets

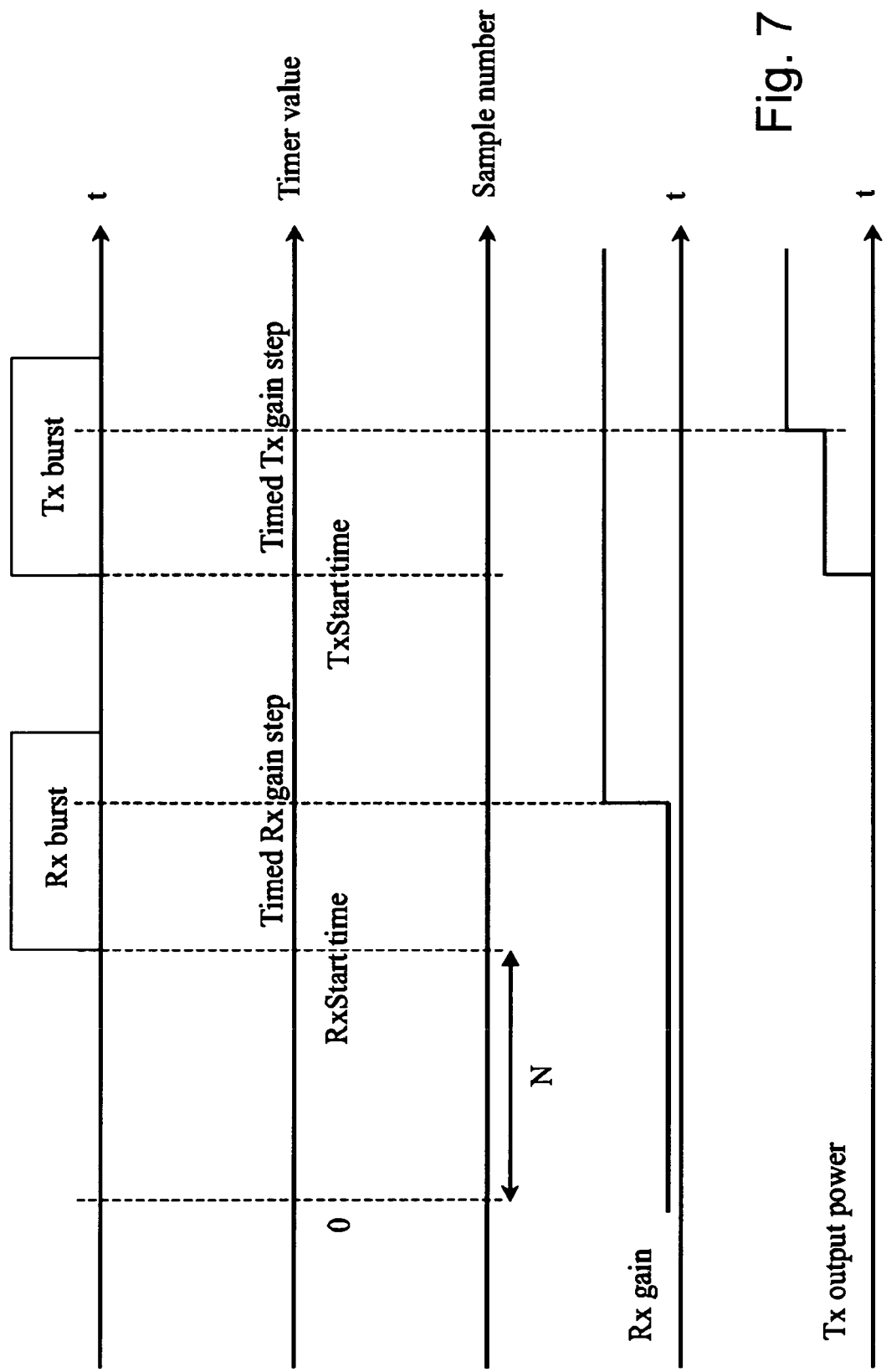

TIME ACCURATE CONTROL OF RF OVER A DIGRF INTERFACE

CROSS-REFERENCE TO RELATED APPLICATION(S) AND CLAIM OF PRIORITY

The present application claims the benefit under 35 U.S.C. §119(a) to a European patent application filed in the European Patent Office on Aug. 12, 2008 and assigned Application No. 08162214.4, the entire disclosure of which is hereby incorporated by reference.

TECHNICAL FIELD

The present invention relates to the field of communication systems, and more particularly to wireless and wired communication systems with a digital RF-BB interface.

BACKGROUND OF THE INVENTION

Continuous technology improvements in the semiconductor industry are consistently increasing the achievable logical gates density. This trend first formulated by Moore, and now well referred to as Moore's law, drives a higher integration of logic into standard silicon. Today, complete wireless modem subsystems can be integrated together with complex audio/video subsystems, application processors and Random Access Memory (RAM) onto one silicon die. As digital logic is the first to take advantage of new technology processes, digital logic typically is the first that can be ported to a new process with which an even higher integration can be achieved. Analog options for a new technology, especially those needed for building radio frequency (RF) components, typically follow later. Thus, it can be very desirable to divide a wireless modem into at least two components, a RF transceiver and a digital Baseband (BB), where the BB can be ported to a new technology as the option becomes possible. A digital interface between the RF transceiver and the BB can be advantageous in such a case to ease integration, particularly when the digital interface is (more or less) technology independent. A digital RF-BB interface further possesses the advantage that the Analog-to-Digital and Digital-to-Analog Converters (ADCs/DACs) reside on the RF side, thereby reducing the need for analog components on the digital die even further.

Currently, the Mobile Industry Processor Interface Alliance (MIPI) group has standardized a serial digital RF-BB interface for cellular phones specified by the DigRF v3 standard. The standardization group is now focusing on other wireless broadband standards, such as the Worldwide Interoperability for Microwave Access (WiMAX™) technology and the Long Term Evolution (LTE) standard under development, also called the DigRF v4 or 4G or 3.9G standard. The digital RF-BB interface allows for transmitting and receiving digitized in-phase (I) and quadrature (Q) samples multiplexed with control commands, respectively towards and from the transceiver. The above DigRF standards also include so-called Time Accurate Strobe (TAS) messages, which are used by the BB for accurate timing of the RF commands. While more digital functions are integrated on the RF side, a simple TAS may not be sufficient due to the variable delays and the extensive sets of commands with various timing moments in the RF transceiver.

The DigRF v4 standard is optimized for power consumption, which is achieved by minimizing the number of interface lines and using asynchronous communication with high-speed data bursts. This is in contrast to previous (prior art) analog and digital interfaces where the number of lines and transfer rate were adapted to the specific wireless standard for which it was used. A characteristic for asynchronous communication with high-speed data bursts is the uncertainties in timing, i.e., no exact timing relation exists between the data samples of the burst and the data samples at the RF transceiver, However, wireless standards require a very accurate timing on the air interface in order to effectively manage access to the spectrum.

In a WiMAX system for example, the base station may advise the terminal to precisely align the transmit signal with a resolution as precise as 90 ns. In order to guarantee such an accurate timing, the latency of the datapath between the BB and the RF transceiver must be fixed. If control and I/Q data share the same serial interface, multiplexing is required and buffers are required on both sides of the interface, and the rate of that interface must be higher than the sum between the I/Q data rate and the control data rate. If the multiplexing is not fixed, but based on prioritization, typically some jitter will be introduced.

Moreover, keeping a precise timing on the air interface can be difficult to reach when, depending on signal conditions, different filters with different group delays are dynamically switched into or out of the receive (RX) or transmit (TX) chain. In particular, the terminal may detect the presence of an impulsive noise source and decide to switch on an impulsive noise-canceling block that had been in bypass mode before. By enabling this block, latencies are thus increased. In another example, this may also be the case when using a standard like IEEE 802.11g, which allows the use of different modes having different fundamental sample rates. For example, it allows the processing of an IEEE 802.11b signal with a sample rate of an integer multiple of 11 MHz, while the Orthogonal Frequency Division Multiplexing (OFDM) modes introduced in IEEE 802.11g are processed with a different sampling rate of 20 MHz. The differing modes are selected based on the detected preamble. Depending on the selected mode, the BB may decide to switch on a sample rate converter to convert the received signal to the desired frequency. The sample rate converter may add to the overall latency of the signal. Thus, the BB only sees arriving samples irrespective of the actual sample rate of the signal, and needs to keep track of the time based on those samples while considering the switching time of the sample rate converter and the conversion rate. In such a configuration, the BB needs to keep track with the latencies introduced by bypassing or not different processing blocks, which can be merely cumbersome.

SUMMARY

To address the above-discussed deficiencies of the prior art, it is a primary aspect of the present invention to provide a communication system with an accurate timing at the air interface even if a serial RF-BB interface with uncertainty in scheduling of control and I/Q data is introduced in the system.

The timer block may comprise at least one comparator for comparing the time event with the timer value n, and positively responding to the time event as a comparison result whenever the time event equals the timer value n. In a simplified embodiment, the timer may be reset at start of the transmission (RxStart). However, assuming that the counter repetition period is large enough and no ambiguity in the timer events can happen; this is a general requirement, which e.g., can be fulfilled by a 32-bit counter as timer. It is noted that the concept described below does not assume that counters are reset. Instead, a time stamp as time reference may be assigned to a certain data sample in the RF subsystem by means of an initial timer value, e.g., $n_{RX0}$, $n_{TX0}$, at a certain time event. That is to say, for example at the RxStart command, the first RX sample gets the label $n_{RX0}$. Then, the timer counter may continue uninterrupted and wrap if necessary as long as accounted for in the timer event calculations.

The timer block may further comprise a counter for providing the timer value n.

The timer value n, which is considered as an initial timer value $n_{RX0}$, $n_{TX0}$ may be assigned as the time reference to the first data sample in a stream of samples at the receive (RX) chain and the transmit (TX) chain, respectively, which relate to first samples ($k_{RX}=0$ and $k_{TX}=0$) at the BB subsystem as soon as a first valid data sample amongst said continuous stream enters a reference point referred to by said timer block (144). The timer may run at any rate, as long as a sample at the timer reference point can accurately be associated with a clock tick of the timer, i.e., the time reference as timestamp. For instance, in certain embodiments the timer reference point may be the input of the converter in RX direction and converter output in TX direction.

The relation between the timer value n and the number k may take into consideration a delay parameter $\tau$ between the converter and the reference point, and a conversion parameter $\rho$ for converting a count event into a time event. Therefore, the accuracy can be improved if such delay exists.

Additionally, the relation between the timer value n and the number k may also take into consideration an offset parameter $\Delta$ between the converter and the reference point.

Thereby, the accuracy can be once more improved if such offset exists.

The converter may be a First-In First-Out (FIFO) buffer.

The at least one comparator may be programmable.

In accordance with the present invention, there is provided a method of generating a control process for controlling a RF subsystem by a BB subsystem over a digital interface, the method includes: initiating the control process in response to a time event from the BB subsystem; assigning a time reference by a timer block in the RF subsystem to a continuous stream of data samples towards and from the BB subsystem; and aligning a counter in the BB subsystem with the time reference based on a relation between a timer value n provided by the timer block and a number k of the data samples counted by the counter.

The steps of the previous method can be carried out by a computer program comprising program code means when the computer program is carried out on a computer, which is in the context of the present invention for example an embedded processor, which may be called a dedicated central procession unit (CPU). For example, such an embedded processor may be located near and may be dedicated to the RF subsystem, i.e., the processor can be located on the same chip.

The present invention further extends to a chip set of integrated circuits comprising the preceding system. That is to say, the chip set comprises at least two chips providing improved communication between this two chips, e.g., the RF subsystem may be located at one first chip and the BB subsystem at another.

Finally yet importantly, the present invention enables a very power efficient interface by means of a small number interface lines over which (asynchronous) high-speed data bursts are transported, while maintaining accurate timing relation between the RF and BB subsystems.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 7 illustrates a diagram for a precise alignment within the time t of gain control signals based on the alignment of the TX and RX bursts of FIG. 6.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

Figure 1:
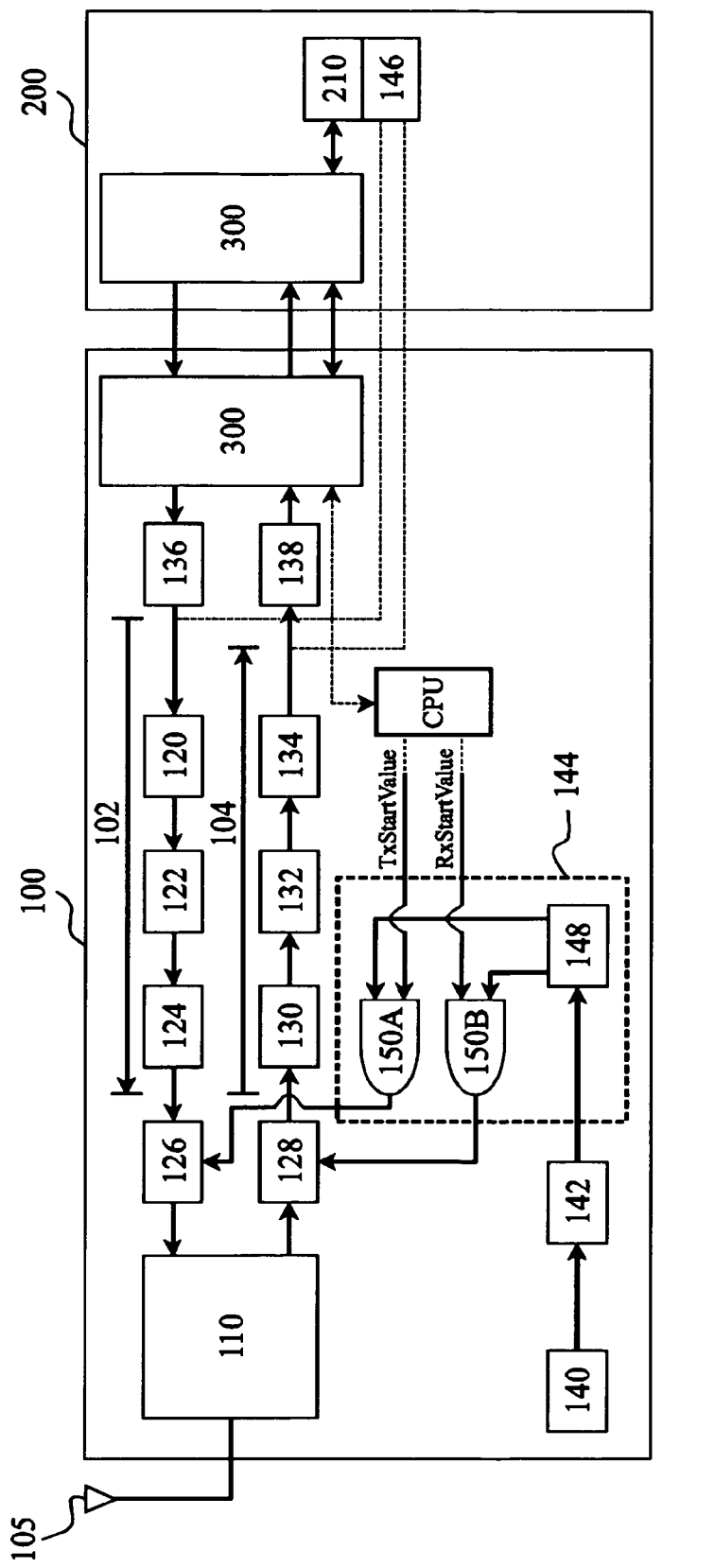
FIG. 1 illustrates a block diagram of a communication system according to an embodiment of the present invention.

FIG. 1 illustrates a block diagram of a communication system 10 according to the present invention. A radio frequency (RF) subsystem 100, e.g., a transceiver (TRX), communicates with a baseband (BB) subsystem 200 through a digital RF-BB interface 300. The RF subsystem 100 receives and transmits analog RF signals over a wireless network via an antenna 105. The RF subsystem 100 comprises both a transmit (TX) chain 102 spanning a digital processing domain and an analog processing domain for processing a transmit (TX) signal, and a receive (RX) chain 104 spanning the analog and digital processing domains for processing a receive (RX) signal.

The analog processing domain 110 can comprise a transmission (TX) and receiver (RX) switch in a time division duplex (TDD) or a combiner in a frequency division duplex (FDD) scheme, a low noise amplifier in the RX chain 104, a power amplifier in the TX chain 102, and a duplexer for isolating the TX data transmitted from the power amplifier towards the antenna 105 and the RX data received from the antenna 105 at the low noise amplifier. The amplifiers and switches are controlled by the RF subsystem 100, which is in turn controlled by the BB subsystem 200 through the digital RF-BB interface 300. It will be understood that the RF subsystem 100 can also include additional communication components, which are not shown in FIG. 1 for sake of simplicity and clarity.

In the digital processing domain, the digital RF-BB interface 300, which may be serial, multiplexes the I/Q data and control signals provided by the BB subsystem 200 in the TX direction, and the I/Q data, control responses as well as indications provided by the RF subsystem 100 in the RX direction. The I/Q data format in both TX and RX chains 102, 104 may be a complex signal carrying I and Q data.

The TX chain 102 pulls the de-multiplexed I/Q data samples from the BB subsystem 200 and first buffers them in a first-in first-out (FIFO) buffer 136. Since the RF-BB interface 300 can multiplex both the I/Q data and control signals, the I/Q data samples are transmitted in bursts over that RF-BB interface 300 from the BB subsystem 200 towards the RF subsystem 100. The role of the FIFO buffer 136 is to convert these burst data into a continuous data stream. Afterwards, the continuous stream of I/Q data samples is successively passed through a fractional sample rate converter (F-SRC) 120 for adapting the sample rates of the I/Q data to the sample rate of the RF subsystem 100, a digital filter 122 having a transfer function $H_{TX}(z)$, an up-sampling filter 124 for increasing the sample rate of the RF subsystem 100, and a digital-to-analog converter (DAC) 126 (or a pair of DACs if the data format is a complex signal carrying I and Q data) for being finally converted from a digital signal into an analog signal. After leaving the digital processing domain, the analog signal enters the analog-processing domain for being converted into an analog RF signal.

Thus, it can be seen that the TX chain 102 is implemented in a data-driven fashion, namely through a flow control mechanism, which ensures that the BB subsystem 200 always delivers enough samples for avoiding that the FIFO buffer 136 runs empty, which avoids any overflow by allowing the BB subsystem 200 to push data into the RF subsystem 100 until the FIFO buffer 136 is sufficiently filled, and which provides in the digital processing domain of the TX chain 102 a continuous data stream from the FIFO buffer 136 up to the DAC 126. Furthermore, the flow control may be enhanced by adding Clear To Send (CTS) and Request To Send (RTS) signaling messages to the RF-BB transfer protocol.

In the RX chain 104, the analog RF signal is down-converted to baseband using mixers, and the analog signal is converted into a digital signal, namely into a continuous stream of I/Q data samples, using an analog-to-digital converter (ADC) 128 (or a pair of DACs if the data format is a complex signal carrying I and Q data). Then, the continuous data stream is successively passed through a decimator 130 for being decimated, i.e., down-sampled and lowpass-filtered, a digital filter 132 having a transfer function $H_{RX}(z)$, and a fractional sample rate converter (F-SRC) 134 for adapting the sample rate of the I/Q data to the sample rate of the BB subsystem 200. The obtained I/Q data samples are then accumulated in a FIFO buffer 138 whose content is transmitted in bursts from the RF subsystem 100 towards the BB subsystem 200 through the RF-BB interface 300, which multiplexes both the data bursts, control responses and indications.

Thus, it can be seen that the RX chain 104 is also implemented in a data-driven fashion, namely through a flow control mechanism that allows the RF subsystem 100 to push data from the FIFO buffer 138 into the BB subsystem 200 through the RF-BB interface 300 without losing any data.

The RF subsystem 100 of FIG. 1 further includes, in the digital processing domain, a phase-locked loop (PLL) 140 generating frequency clocks for the DAC 126 and the ADC 128. The frequency clocks are used by a divide-by-N frequency divider 142 for clocking, with a constant rate, a timer 144 that assigns a timestamp, i.e., a time reference, to the data stream in both TX and RX chains 102, 104. The timer 144 may be implemented by a 32-bit up- or down-counter 148 and two comparators 150A, 150B. However, it is worth noting that 32-bit is an embodiment of the general concept. The requirement merely is that the counter should be unambiguous to timer events for the specific application. At a specific moment corresponding to a time event denoted as TxStartValue or RxStartValue and being defined by its controller 210, the BB subsystem 200 requests opening the respective TX and RX chains as a control command or as a part of a data stream in the TX chain, while the values, TxStartValue and RxStartValue, are stored in the respective comparators 150A, 150B, e.g., AND gates. It is to be noted that the control command may be interpreted and executed by a Central Processing Unit (CPU) residing in the RF subsystem 100 for thereby allowing the CPU to handle more complex timing and comparator settings. The role of the comparators 150A, 150B is to compare the respective TxStartValue and RxStartValue transmitted by the BB subsystem 200 with the timer value issued from the up- or down-counter 148. When the timer value becomes equal to the RxStartValue, a RxStart command is triggered in output by the respective comparator 150B towards the ADC 128 for signaling the ADC 128 to push data into the RX chain 104, namely for enabling the RX mode. Likewise, when the timer value becomes equal to the TxStartValue, a TxStart command is triggered by the respective comparator 150A towards the DAC 126 for signaling the DAC 126 to pull data from the TX chain 102, namely for enabling the TX mode. It is also noted that in a particular embodiment, the respective comparators 150A, 150B may be programmable to trigger an RxStart or TxStart command at programmable values of the up- or down-counter 148. There are various clock rates within the RF subsystem 100. For example, the ADC 128 may use a very high sample rate if a sigma-delta analog-to-digital converter (SD-ADC) is used, while the DAC 126 may use a fairly high sample rate without significant impact in power. At the other end, the sample rate of the I/Q data is adapted to the sample rate of the BB subsystem 200 through the F-SRC 134 in the RX chain 104. Furthermore, the BB subsystem 200 may employ different sample rates according to the TX or RX direction. The timer 144 may run at any rate as long as a data sample at the timer reference point can accurately be associated with the clock tick or cycle of this timer 144. The timer reference point may be the DAC output in the TX chain 102 and the ADC input in the RX chain 104. To attain the desired accuracy, two parameters in each TX and RX direction are important: the delay τ between the respective FIFO buffer 136, 138 and the timer reference point and the ratio ρ between the sample rate of the BB subsystem 200 and the timer clock. When related to the TX chain 102 or the TX direction, these parameters are respectively denoted $\tau_{TX}$ and $\tau_{TX}$, and when related to the RX chain 104 or the RX direction, respectively denoted $\tau_{RX}$ and $\tau_{RX}$.

The delays $\tau_{TX}$, $\tau_{RX}$ are known by the controller of the RF subsystem 100, and may change according to the different configurations of the respective TX and RX chains 102, 104. The delays $\tau_{TX}$, $\tau_{RX}$ have a first purpose of linking a sample counter 146 to the timer reference point. The sample counter 146, which is located in the BB subsystem 200, counts the number of data samples provided by the FIFO buffer 136 in the TX chain 102 and the number of data samples entering the FIFO buffer 138 in the RX chain 104. The delays $\tau_{TX}$, $\tau_{RX}$ together with the maximum delay introduced by the RF-BB interface 300 have a second purpose of giving indication to the BB subsystem 200 about when the signal arrives at the latest at the FIFO buffer 136 in the TX chain 102 and when the signal can be read at the earliest from the FIFO buffer 138 in the RX chain 104.

Furthermore, as defined above, the purpose of the ratios $\rho_{TX}$, $\rho_{RX}$ is to convert the sample counter based events from the BB subsystem 200 into timer event values.

Figure 2A:
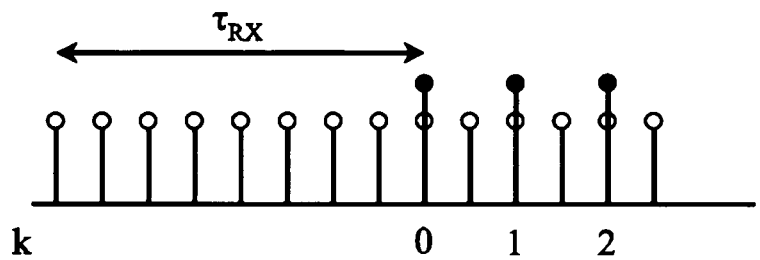
FIGS. 2A-2B illustrate diagrams of the initialization effect from a processing block on the sample count k, in the case of a processing a) without ramp-up giving output samples (solid dots) with a delay $\tau_{RX}$ and b) with ramp-up giving output samples (solid dots) with a delay $\tau_{RX}$ and an initial offset $\Delta_{RX}$.
Figure 2B:
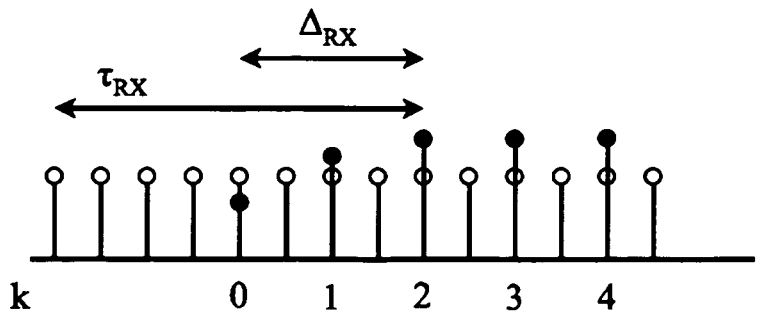

Additionally, the relation between the sample counter 146 and the timer 144 should take into account some effects within the different processing blocks inside the TX and RX chains 102, 104. For example, the RF subsystem 100 may need to initialize these processing blocks, such that the resulting first invalid output samples may or may not be discarded. A typical example of such a processing block may be given by a transversal Finite Impulse Response (FIR) filter, wherein the first half of the impulse response length is not useful. This is illustrated in FIGS. 2A and 2B in the case of a start of a transmission of I/Q data samples in bursts at the FIFO buffer 138 from the RX chain 104 towards the BB subsystem 200. FIG. 2A illustrates the effect of such a processing without ramp-up on the sample count k by the sample counter 146 and with a delay of $\tau_{RX}$, the input samples (indicated by open dots) being processed into output samples (indicated by solid dots) for transmission towards the BB subsystem 200 through the FIFO buffer 138. FIG. 2B illustrates the effect of the same processing with ramp-up on the sample count k by the sample counter 146 and with a delay of $\tau_{RX}$ and an initial offset $\Delta_{RX}$, the input samples (indicated by open dots) being processed into output samples (indicated by solid dots) for transmission towards the BB subsystem 200 through the FIFO buffer 138.

Figure 3A:
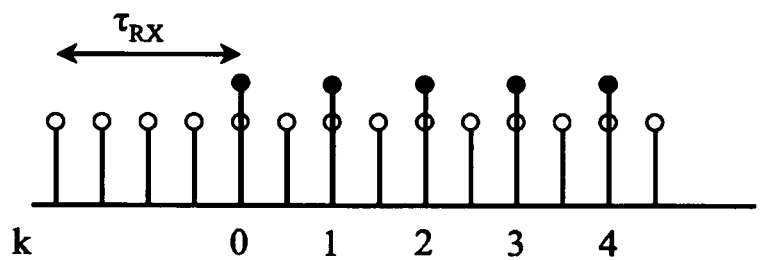
FIGS. 3A-3B illustrate diagrams of the initialization effect from a processing block on the sample count k, in the case of a without ramp-up processing giving a) output samples (solid dots) with a delay $\tau_{RX}$ and b) output samples (solid dots) with a delay $\tau_{RX}$ and a temporary initial offset $\Delta_{RX}$ corresponding to the acceleration time for the first few output samples to catch up for the initialization.
Figure 3B:
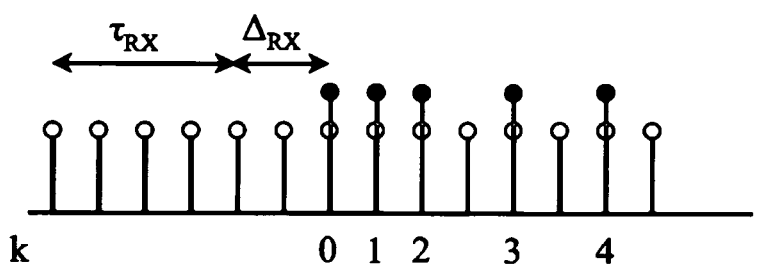

Another effect on the sample count k susceptible to be considered is an accelerated start-up of the output samples (indicated by solid dots). This is depicted in FIG. 3A in the case of a processing without ramp-up at start of a transmission of I/Q data samples in bursts at the FIFO buffer 138 from the RX chain 104 towards the BB subsystem 200 with a delay of $\tau_{RX}$, and in FIG. 3B in a similar case but giving I/Q data samples also with a temporary initial offset $\Delta_{RX}$ that corresponds to the necessary acceleration time for the first few output samples to catch up for the initialization of the related processing block, e.g., a sample rate converter (SRC). It is noted that the offset $\Delta_{TX}$ for the TX chain 102 or $\Delta_{RX}$ for the RX chain 104 is a parameter susceptible to change according to the state, either steady-state as illustrated in FIG. 2B or start-up as illustrated in FIG. 3B, of the process and the processing block used, and the RF subsystem 100 has the task to keep track of this offset parameter.

The relation between the sample count k and the timer value n is further described in the following. The sample count k counted by the sample counter 146 will be denoted as $k_{TX}$ in the TX chain 102 and as $k_{RX}$ in the RX chain 104.

Assuming that the timing is relative to the received data stream in the RX chain 104, a well-defined timing moment may occur when the first data sample is sent in burst from the FIFO buffer 138 towards the BB subsystem 200, and for which corresponds a zero value of the sample count $k_{RX}$ in the RX chain 104, i.e., $k_{RX}=0$. The relation between the sample count $k_{RX}$ in the RX chain 104 and the timer value n is given by the following Equation 1:

$$k_{RX} = \lfloor (n - n_{RX0} - \tau_{RX} - \Delta_{RX}) \cdot \rho_{RX} \rfloor \quad \text{[Eqn. 1]}$$

where the symbol $\lfloor \ \rfloor$ indicates truncating to the nearest lower integer, and the initial timer value $n_{RX0}$ corresponds, by definition, to the timer value n that relates to $k_{RX}=0$, namely that relates to the instant the first relevant data sample in the continuous stream reaches the timer reference point.

The relation between the timer value n and the sample count $k_{RX}$ also determines the timing within the RX chain 104. Thus, if the BB subsystem 200 wants to execute some process at $k_{RX}=k_1$, the RF subsystem 100 shall only take the delay $\tau_{RX}$ and, if existing, the initial offset $\Delta_{RX}$ into consideration and start the process from the timer reference point at the timer value $n_1$ given by the following Equation 2:

$$n_1 = n_{RX0} + \tau_{RX} + \Delta_{RX} + k_1 / \tau_{RX} \quad \text{[Eqn. 2]}$$

Figure 4:
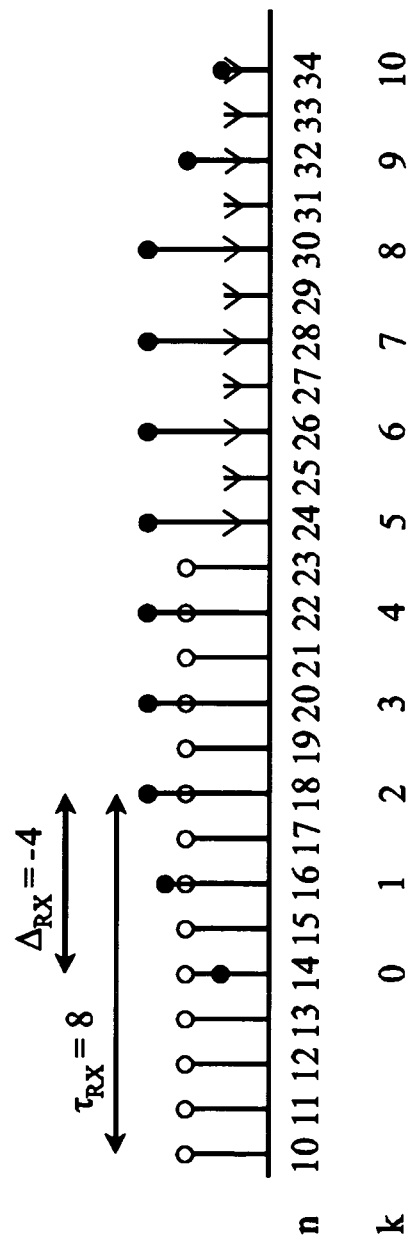
FIG. 4 illustrates a diagram of the relation between the sample count k and the timer value n in the RX chain.

This relation between the sample count k and the timer value n in the RX chain 104 is illustrated in FIG. 4, wherein $n_{RX0}=10$, $\tau_{RX}=8$, $\Delta_{RX}=-4$ and $\tau_{RX}=0.5$. The samples with open dots are counted with n whenever they enter the timer reference point, while the samples with the solid dots are located at the FIFO buffer 138 before being sent in bursts towards the BB subsystem 200, and counted with k. Additionally, FIG. 4 depicts non-valid samples (indicated by arrows) entering the timer reference point at n=24. Thus, it can be seen that if the BB subsystem 200 wants to switch off the RX chain 104 after the burst at $k_{RX}=k_1=9$ for example, then the RF subsystem 100 shall switch off the RX chain 104 at the timer value $n=n_1=10+8-4+9/0.5=32$.

Similarly, if the first sample received at the FIFO buffer 136 from the BB subsystem 200 is taken as reference, the relation between the sample count $k_{TX}$ in the TX chain 102 and the timer value n is given by the Equation 3:

$$k_{TX} = \lfloor (n - n_{TX0} - \tau_{TX} - \Delta_{TX}) \cdot \rho_{TX} \rfloor \quad \text{[Eqn. 3]}$$

where the symbol $\lfloor \ \rfloor$ indicates truncating to the nearest lower integer, and the initial timer value $n_{TX0}$ corresponds to the timer value n that relates to $k_{TX}=0$, namely that relates to the instant the first relevant data sample in the continuous stream reaches the timer reference point.

The moment where the sample at $k_{TX}=k_2$ enters the timer reference point at $n=n_2$ is calculated using the delay $\tau_{TX}$ and, if existing, the initial offset $\Delta_{TX}$ in the TX chain 102, as given by the Equation 4:

$$n_2 = n_{TX0} + \tau_{TX} + \Delta_{TX} + k_2 / \tau_{TX} \quad \text{[Eqn. 4]}$$

Figure 5:
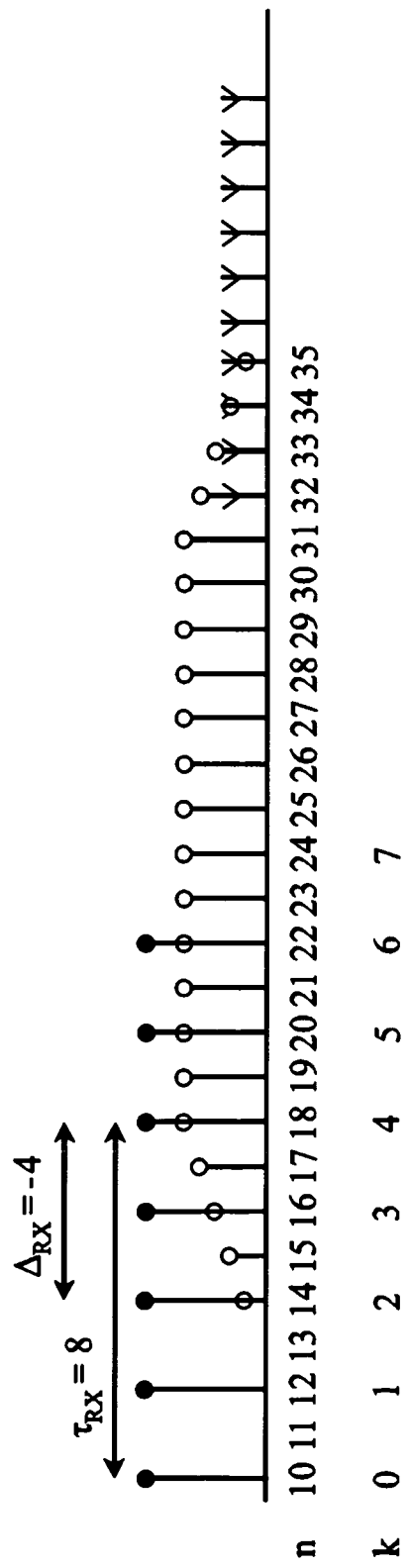
FIG. 5 illustrates a diagram for the relation between the sample count k and the timer value n in the TX chain.

This relation between the sample count k and the timer value n in the TX chain 102 is illustrated in FIG. 5, wherein $n_{TX0}=10$, $\tau_{TX}=8$, $\Delta_{TX}=-4$ and $\tau_{TX}=0.5$. The samples with open dots are counted with n whenever they enter the timer reference point, while the samples with the solid dots are located at the FIFO buffer 136 and counted with k. Additionally, FIG. 5 depicts non-valid samples (indicated by arrows) entering the timer reference point at n=32. Thus, it can be seen that if the BB subsystem 200 wants to switch off the TX chain 102 after the burst at $k_{TX}=k_2=7$ for example, then the RF subsystem 100 shall switch off the TX chain 102 at the timer value n=$n_2$=10 +8−4+7/0.5=28.

The relation between the TX and RX chains 102, 104 is also described in the following. In a communication system like WiMAX for example, the terminal has to adapt its transmit timing to the received signal of the base station. If the RX signal is taken as reference, the relation between the timer value $n_1$ and the sample count $k_1$, as described in the Equation 2, gives the timing of the RX chain 104. The timing of the TX chain 102 can also relate to the sample count $k_{RX}$ in the RX chain 104 if the initial timer value $n_{RX0}$ relates to $k_{RX}$=0 and the sample count $k_{TX}$ in the TX channel 102 is started simultaneously with the sample count $k_{RX}$ in the RX channel 104. To start or end a process at $k_{TX}$=$k_3$, the timer reference point at n=$n_3$ should be used for the TX channel 102, and is given by the Equation 5:

$$n_3 = n_{RX0} + \tau_{TX} + \Delta_{TX} + k_3/\rho_{TX} \quad [\text{Eqn. 5}]$$

Figure 6:
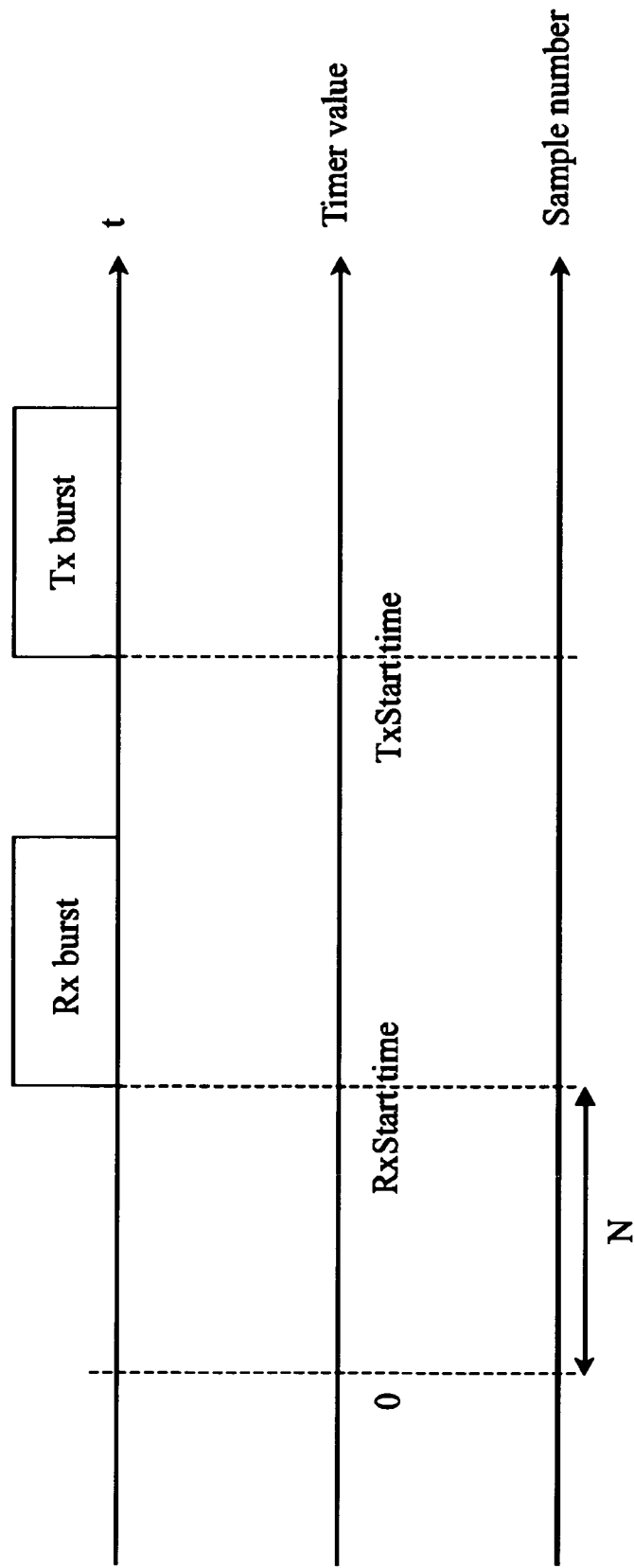
FIG. 6 illustrates a diagram for a precise alignment within the time t of a TX burst with respect to RX burst at the air interface.

FIG. 6 illustrates the process according to an embodiment of the present invention for precisely aligning, within the time t, a data burst (hereafter designated as TX burst) from the BB subsystem 200 with respect to a data burst (hereafter designated as RX burst) from the RF subsystem 100 at the air interface, even if the burstiness of the RF-BB interface 300 introduces some jitter to the received signal. This precise alignment between TX burst and RX burst can be achieved using the timer 144 in the RF subsystem 100 and the relations linking the sample count k to the timer value n.

At first, the BB subsystem 200 commands the RF subsystem 100 to receive by transmitting an RxStartValue signal towards the input of the corresponding comparator 150B inside the timer 144 for comparison with the actual timer value. When the actual timer value reaches the RxStartValue stored in the corresponding comparator 150B, a RxStart command is initiated for signaling the ADC 128 to receive, namely for enabling the RX mode. As soon as valid data samples enter the timer reference point at the ADC input, the corresponding initial timer value $n_{RX0}$ is stored as a timestamp, i.e., a time reference. This timestamp may be stored in the RF subsystem 100 or sent by it towards the BB subsystem 200. The advantage in the latter case lies in the fact that the BB subsystem 200 also takes care of further references, which allows getting an absolute reference in the cases of multiple RX streams or continuous RX mode for example, rather than a mere relative sample count. The BB subsystem 200 then counts the number N of received samples through the sample counter 146. The controller of the RF subsystem 100 will label the first sample $k_{RX}$=0 at the FIFO input with the stored timestamp $n_{RX0}$, which may also be converted into sample count units ($\tau_{RX} \cdot n_{RX0}$), and performs a signal detection using correlation or power-based methods for example. From the signal detection, the BB subsystem 200 can determine on which sample a RX burst has started. Since the BB subsystem 200 includes no full sense of time, the BB subsystem 200 can know only the received sample number after starting the RX chain 104. Assuming the BB subsystem 200 detects the beginning of the RX burst at the N-th received sample and all SRC factors are known by it, the BB subsystem 200 can calculate, using the above Equation 2, the timer value, i.e., RxStart time, that relates to this N-th sample and from which the RX burst starts. Based on the knowledge of the RxStart time, the BB subsystem 200 can now calculate the TxStartValue according to the transmission standard and relative to the presumed RxStartValue, and program the timer 144 accordingly by calculating the timer value, i.e., TxStart time, from which the TX burst can start for being aligned with the RX burst, while considering the delay $\tau_{TX}$ and, if existing, the initial offset $\Delta_{TX}$ in the TX chain 102. However, either the BB subsystem 200 or the RF subsystem 100 shall first account for the delay $\tau_{TX}$ in the TX chain 102, and the BB subsystem 200 shall then ensure that any data is available in TX chain 102 before the timer 144 reaches the TxStartValue. For avoiding any consideration of the delay $\tau_{TX}$, the FIFO buffer 136 may also be located next to the DAC 126, but this requires that the TX chain 102 processes the incoming data samples at the rate, perhaps irregular, that the BB subsystem 200 can deliver.

It is noted that the precision of the alignment between the TX and RX bursts at the air interface also depends on the time resolution, namely on the frequency with which the timer 144 is clocked. However, since with today's technology, a simple 32-bit counter can easily be clocked with frequencies of several hundred MHz, accuracies far below 10 ns can be achieved.

It is further noted that the accuracy is a relative notion that is linked to the amount of jitter at the air-interface due to the RF-BB interface 300 and the related processing.

Applications contemplated for such a present invention include any wired or wireless communication system, such as LTE, WiMAX, or mobile standards like Global System for Mobile communications (GSM), Universal Mobile Telecommunications System (UMTS), High Speed Downlink Packet Access (HSDPA) for example, where an accurate control at the air-interface is required. In particular, the present invention is applicable to any digital RF-BB interface with appropriate control channels, such as the MIPI standard DigRF v4, also called DigRF 4G or DigRF 3.9G, and the MIPI standard unified protocol (UniPRO) over D-PHY. By defining an appropriate set of commands, other existing interfaces such as DigRF v3 (and DigRF with a lower version), JEDEC's JC-61, NevvLogic's HiSS™, and Analog Devices' ADI-IQTM for example, can also be adapted to work with the present invention.

In a further application, the concept of timed control of the present invention can also be extended to other time critical controls, e.g., gain steps in RX or TX direction. If the RF subsystem 100 does not contain a CPU, the extension can be implemented by adding, for each timed control signal, another comparator, e.g., a AND gate, to the timer 144, which improves the accuracy of the timing. Alternatively, if the RF subsystem 100 contains a CPU, the extension can be implemented by adding at least one comparator to the timer 144 and hardwiring the signals of the at least one comparator to an interrupt controller of the CPU. Then, the CPU can execute an arbitrary command based on a timed interrupt signal. Derived from FIG. 6, FIG. 7 illustrates a precise alignment, within the time t, of the gain control signals, i.e., Rx gain and Tx output power, using the timer 144 of the RF subsystem 100, wherein the timer values corresponding to the timed Rx gain step and timed Tx gain step are calculated by the BB subsystem 200 based on the timer values of the RxStart time and TxStart time, respectively.

In summary, a communication system 10 consisting of a RF subsystem 100 and a BB subsystem 200 for modulation and demodulation (modem) has been described. The RF subsystem 100 communicates with the BB subsystem 200 through a digital RF-BB interface 300 multiplexing the I/Q data and control signals in both TX and RX directions. The RF subsystem 100 comprises at least a FIFO buffer 136, 138 in each respective TX and RX chain 102, 104 for converting between a data burst at the digital interface and a continuous stream of I/Q data samples at the RF subsystem, and a timer 144, which assigns a timestamp to the continuous stream in both TX and RX chains 102, 104. The BB subsystem 200 comprises at least a sample counter 146 for counting the number k of data samples at the FIFO buffer 136, 138 and a controller 210 for defining the time event. Precise alignment at the air interface between a data burst from the RF subsystem 100 and a data burst from the BB subsystem 200 can be achieved using the timer 144, based on the relation between the timer value n and the sample count k.

While the present invention has been illustrated and described in detail in the drawings and foregoing description, such illustration and description are to be considered illustrative or exemplary and not restrictive; the invention is not limited to the disclosed embodiments. Thus, a simplified embodiment may be proposed wherein: the sample rates of the BB subsystem 200 in each TX and RX direction are identical in order to have a single ratio $\rho$ $(=\rho_{TX}=\rho_{RX})$ between the sample rate of the BB subsystem 200 and the timer clock; the conversion ratio $\rho$ is known by the BB subsystem 200; a single sample count k $(=k_{TX}=k_{RX})$ is used in the TX an RX chains 102, 104 and relates to the initial timer value $n_{RX0}$; and the initial offsets $\Delta_{TX}$, $\Delta_{RX}$ in both TX and RX chains 102, 104 are considered identical. A further simplification may be proposed where RxStart, triggered by a time event or control command, resets the timer value. In that case, the initial timer value $n_{RX0}$ is zero. It does not need to be stored and may be ignored in calculation of time value and sample count.

In another embodiment, the RF subsystem 100 may include a CPU for interpreting and executing commands from the BB subsystem 200, and further control mechanisms may ease the programming; the BB subsystem 200 may read the actual timer value through the RF-BB interface 300 and latencies may in this case need to be taken into account, but such a read option allows for implementing a loosely coupled timer in the BB subsystem 200; the RF subsystem 100 may hide all variable delays introduced by the TX or RX chain 102, 104 by adding or subtracting the corresponding time difference expressed in timer values; and when the BB subsystem 200 stops sending I/Q data in the TX direction or when a End Of Transmission (EOT) command is sent, zeros may be inserted in the I/Q paths before the physical transmission is actually disabled.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single or other unit may fulfill the functions of several items recited in the claims. The mere fact that certain measures are recited in mutually different dependent claims does not indicate that a combination of these measured cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

Although the present disclosure has been described with an exemplary embodiment, various changes and modifications may be suggested to one skilled in the art. It is intended that the present disclosure encompass such changes and modifications as fall within the scope of the appended claims.

What is claimed:
1. A communication system, comprising:
   a Radio Frequency (RF) subsystem;
   a Baseband (BB) subsystem; and
   a digital interface operable to allow said radio frequency (RF) subsystem and said BB subsystem to communicate;
   wherein said RF subsystem includes at least
      a converter operable to convert a data burst into a continuous stream of data samples at a transmit (TX) chain and to convert a continuous stream into a data burst of data samples at a receive (RX) chain, respectively, and
      a timer block operable to provide a timer value (n), assigning a time reference to said continuous stream of data samples, and to respond to a time event (TxStartValue, RxStartValue); and
   wherein said BB subsystem includes at least
      a controller operable to define said time event, and
      a counter operable to count a number (k) of said data samples at said converter, said counter being aligned with said time reference based on a relation between said timer value (n) and said number (k); and
   wherein the BB subsystem controller is operative to account for delays introduced by said digital interface by the relation between said timer value (n) and said number (k).

2. The system according to claim 1 wherein said timer block comprises at least one comparator operable to compare said time event with said timer value (n) and to positively respond to said time event as a comparison result whenever said time event equals said timer value (n).

3. The system according to claim 2, wherein said timer value (n) is an initial timer value ($n_{RX0}$, $n_{TX0}$) assigned as said time reference to the first data sample in a stream of samples at the receive (RX) chain and the transmit (TX) chain, respectively, which relate to first samples ($k_{RX}=0$ and $k_{TX}=0$) at the BB subsystem as soon as a first valid data sample amongst said continuous stream enters a reference point referred to by said timer block.

4. The system according to claim 3, wherein said relation between said timer value (n) and said number (k) takes into consideration a delay parameter ($\tau$) between said converter and said reference point, and a conversion parameter (p) for converting a count event into a time event.

5. The system according to claim 4, wherein said relation between said timer value (n) and said number (k) further takes into consideration an offset parameter ($\Delta$) between said converter and said reference point.

6. The system according to claim 5, wherein said converter is a first-in first-out (FIFO) buffer.

7. The system according to claim 2, wherein said timer block further comprises a counter operable to provide said timer value (n).

8. The system according to claim 7, wherein said counter of said timer block and said at least one comparator are programmable.

9. A method of generating a control process for controlling a radio frequency (RF) subsystem by a baseband (BB) subsystem over a digital interface, said method comprising:
   initiating said control process in response to a time event (TxStartValue, RxStartValue) from said BB subsystem;
   assigning a time reference by a timer block in said RF subsystem to a continuous stream of data samples towards and from said BB subsystem;
   aligning a counter in said BB subsystem with said time reference based on a relation between a timer value (n) provided by said timer block and a number (k) of said data samples counted by said counter; and
   controlling, by said BB subsystem, reception and transmission of said stream of data samples by said RF subsystem by providing said time reference across a digital interface between said BB subsystem and RF subsystem, such that delays introduced by said digital interface are accounted for by said time value (n) and number (k) relation.

10. The method according to claim 9, further comprising comparing the time event with the timer value (n), and positively responding to the time event as a comparison result whenever the time event equals the timer value (n).

11. The method according to claim 10, wherein the timer value (n) is an initial timer value ($n_{RX0}$, $n_{TX0}$) assigned as the time reference to the first data sample in a stream of samples at the receive (RX) chain and the transmit (TX) chain, respectively, which relate to first samples ($k_{RX}=0$ and $k_{TX}=0$) at the BB subsystem as soon as a first valid data sample amongst the continuous stream enters a reference point referred to by the timer block.

12. A communication device for use in a wireless communication network, the device comprising:
 a Radio Frequency (RF) unit operable to convert a data burst into a continuous stream of data samples at a transmit (TX) chain and to convert a continuous stream into a data burst of data samples at a receive (RX) chain, respectively;
 a Baseband (BB) unit; and
 a digital interface adapted to allow the RF unit and the BB unit to communicate;
 wherein the BB unit comprises at least:
 a controller operable to define a time event; and
 a counter unit operable to count a number (k) of data samples at a converter in the RF unit, the counter unit aligned with a time reference of the continuous stream of data samples based on a relation between a timer value (n) maintained in the RF unit and the number (K), said relation accounting for delays introduced by said digital interface.

13. The device according to claim 12, wherein the RF unit comprises:
 a converter operable to convert a data burst into a continuous stream of data samples at a transmit (TX) chain and to convert a continuous stream into a data burst of data samples at a receive (RX) chain, respectively; and
 a timer block operable to provide a timer value (n), assigning a time reference to the continuous stream of data samples, and to respond to a time event (TxStartValue, RxStartValue).

14. The device according to claim 13, wherein the timer block is configured to compare the time event with the timer value (n), and to positively respond to the time event as a comparison result whenever the time event equals the timer value (n).

15. The device according to claim 14, wherein the timer value (n) is an initial timer value ($n_{RX0}$, $n_{TX0}$) assigned as the time reference to the first data sample in a stream of samples at the receive (RX) chain and the transmit (TX) chain, respectively, which relate to first samples ($k_{Rx}=0$ and $k_{Tx}=0$) at the BB subsystem as soon as a first valid data sample amongst said continuous stream enters a reference point referred to by said timer block.

16. The device according to claim 15, wherein the relation between the timer value (n) and the number (k) takes into consideration a delay parameter ($\tau$) between the converter and the reference point, and a conversion parameter ($\rho$) for converting a count event into a time event.

17. The device according to claim 16, wherein the relation between the timer value (n) and the number (k) further takes into consideration an offset parameter ($\Delta$) between the converter and the reference point.

18. The device according to claim 17, wherein the converter is a first-in first-out (FIFO) buffer.

19. The device according to claim 14, wherein the timer block further comprises a counter operable to provide the timer value (n).

20. The device according to claim 19, wherein the counter of the timer block and the at least one comparator are programmable.

* * * * *